Dec. 1, 1970 R. B. TROUSDALE 3,544,972

DIGITAL PLOTTING SYSTEM

Filed Dec. 13, 1967 4 Sheets-Sheet 1

INVENTOR
ROBERT B. TROUSDALE
BY

ATTORNEY.

INVENTOR.
ROBERT B. TROUSDALE
BY
ATTORNEY.

INVENTOR.
ROBERT B. TROUSDALE
BY
ATTORNEY.

| | | | | | | | |
|---|---|---|---|---|---|---|---|
| 0 | – | 0 | 0 | 0 | 0 | 0 | 0 |
| 0 | 1 | 1 | 1 | – | – | 0 | 0 |
| 0 | 0 | 0 | 0 | 0 | 0 | 1 | 1 |

INVENTOR.
ROBERT B. TROUSDALE

BY

ATTORNEY.

United States Patent Office 3,544,972
Patented Dec. 1, 1970

3,544,972
DIGITAL PLOTTING SYSTEM

Robert B. Trousdale, Sana Ana, Calif., assignor to California Computer Products, Inc., Anaheim, Calif., a corporation of California Filed Dec. 13, 1967, Ser. No. 690,308
Int. Cl. G05b *19/18*
U.S. Cl. 340—172.5 6 Claims

ABSTRACT OF THE DISCLOSURE

A variable length positional notation instruction word format may be used to effectuate efficient transmission of incremental plotting data encoding both a small and large number of incremental movements. These instructions may be decoded and used to generate 4-bit command words compatible with existing plotting devices to control the direction of each incremental movement thereof. The drawing of straight lines which are not parallel to a basic plotting direction may be approximated by a series of elementary movements. The direction of these elementary movements may be determined from the polarity of the difference obtained by successively subtracting the number of incremental minor axis movements from the number of increments of major axis movement. In addition to encoding the number of major and minor axis increments, an instruction word may also be used to access an auxiliary memory by specifying the address of a stored subroutine.

BACKGROUND OF THE INVENTION

The utilization of incremental plotters to display graphical information is well known in the art. The data information is usually transmitted to a plotting device in the form of a character word comprised of a plurality of binary digits indicating, among other things, the direction of each incremental movement. Typically, such plotting devices have the capability of making single positive or negative incremental steps along each of the major orthogonal cartesian axes, and in addition, to take combined steps, i.e., to make simultaneous movements along each major axis with resultant incremental steps being at 45° with respect to each major axis. Data is typically supplied from a computer or magnetic tape which delivers information at a constant rate which by necessity, must be less than the maximum rate at which the plotter can execute the required movements.

The disadvantage in having to transmit a separate character word to command each incremental movement of an incremental plotting device lies in the fact that many plotting operations are repetitive. Thus, in order to construct a given configuration, each incremental movement of prior art apparatus is normally commanded by a separately transmitted data word. In the case where slow tape transports are employed, or where computer computations are required in order to generate each word command, the rate of information transmission may be considerably slower than the speed of present day incremental plotting devices. The capability of being able to command more than one incremental movement per transmitted word means a considerable saving in the time required to perform the plotting operations.

Accordingly it is an object of the present invention to provide an apparatus for actuating an incremental plotter at a step speed which is equal to or greater than the instruction word transmission rate.

A further object of the invention is to provide a means for plotting a limited selection of repetitive configurations at a speed which is independent of the rate at which instructions are transmitted.

A correlative advantage provided by the present invention is the reduction of the computational operations normally performed by an external data processor.

Other objects and advantages of the present invention will be obvious from the detailed description of a preferred embodiment given below.

SUMMARY OF THE INVENTION

The digital plotting system described herein comprises an electronic digital processing unit for decoding a transmitted instruction word into one or more commands for sequentially actuating an incremental plotting device. By utilizing a variable length instruction word format, both single and multiple increment instructions may be transmitted with efficiency. In addition to commanding plotting operations directly, the transmitted instruction word may be utilized to initiate the logical process required to perform the algorithm for approximating a straight line by incremental plotting or to actuate a stored subroutine by specifying the address in an auxiliary memory where a particular sequence of plotter commands is located.

DETAILED DESCRIPTION OF A PREFERRED EMBODIMENT

Figure 1:
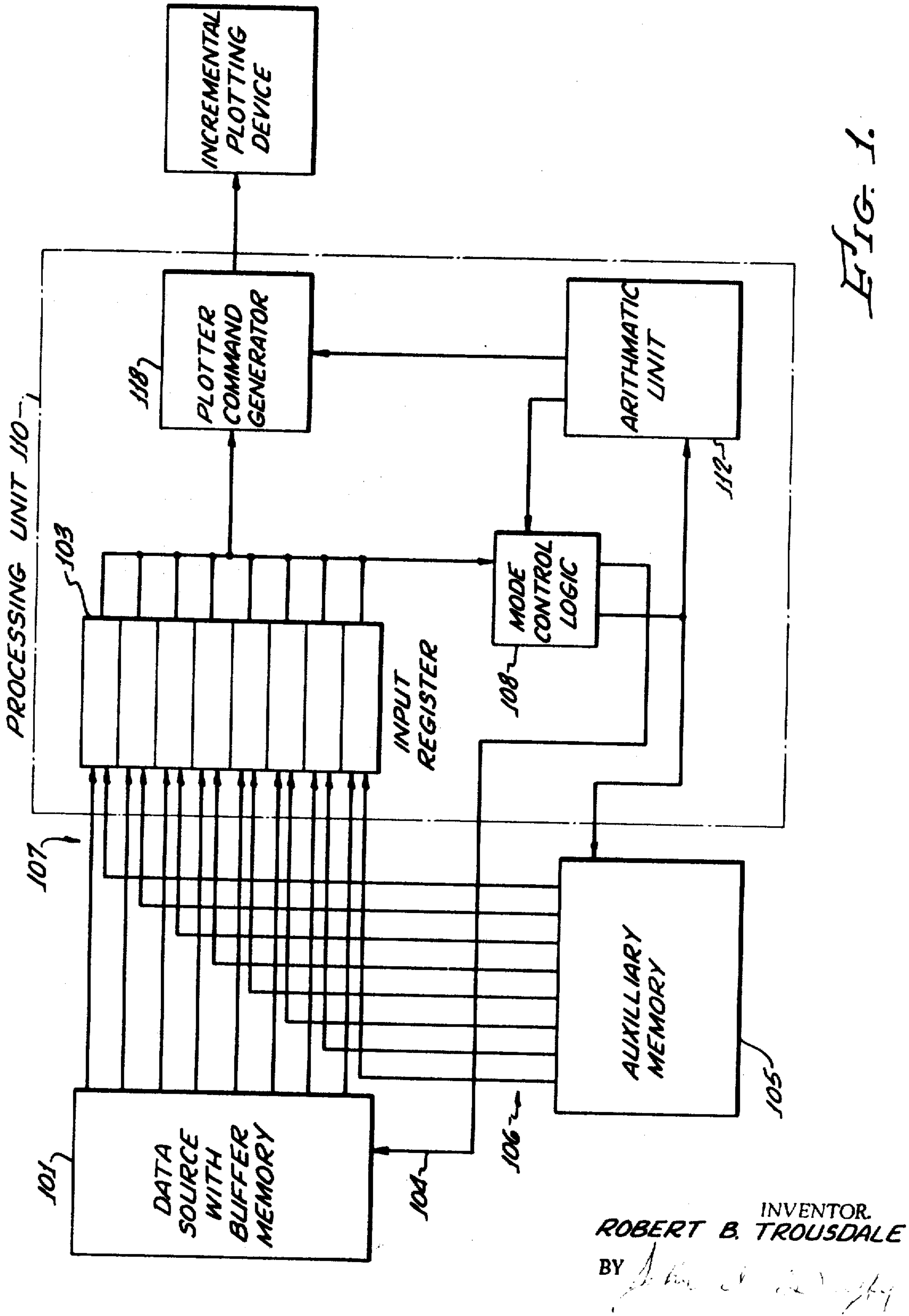
FIG. 1 is a block diagram illustrating the functional relationship between the operative elements of the invention.

Adverting to FIG. 1, the external data source 101, which is typically a magnetic tape transport with an integral core buffer or digital computer, transmits information in the format of an 8-bit command word to the input register 103 of the processing unit 110. A signal line 104, indicating that the plotter has executed the instruction stored in the input register 103, is utilized to instruct the data source to transmit the next instruction word, thus allowing the plotting operations to be carried on at the maximum plotting rate of the plotting device.

Figure 2:
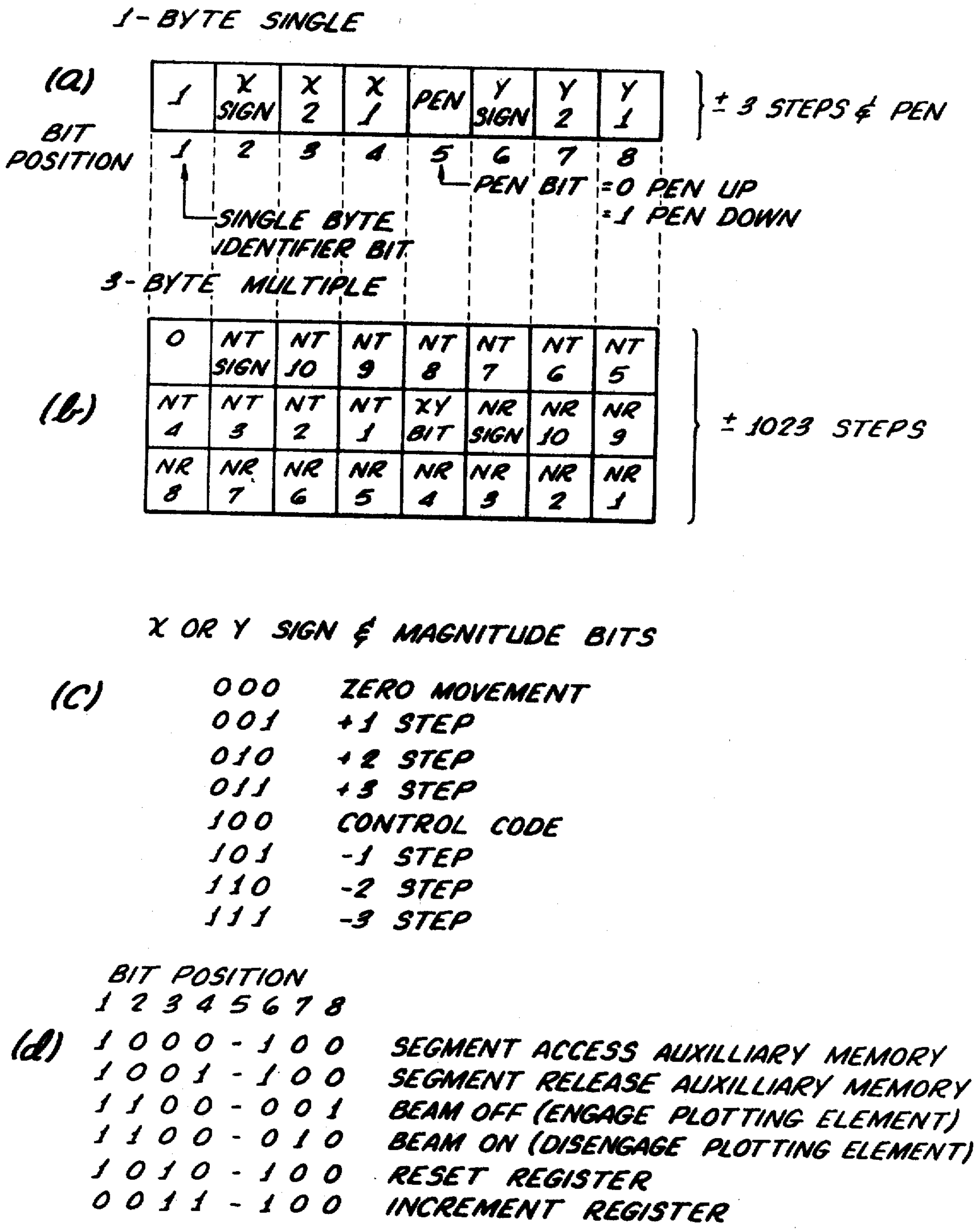
FIG. 2*a* shows the single byte instruction word format.
FIG. 2*b* shows the triple byte instruction word format.
FIG. 2*c* shows how the number of incremental steps are encoded in a single byte instruction word.
FIG. 2*d* is a partial list of redundant codes for controlling certain auxiliary functions.

The details of the instruction word format are shown in FIG. 2. Each 8-bit word is comprised of a first binary position 1, the state of which determines whether an 8- or 24-bit instruction word is being transmitted. Thus, if a binary "1" is transmitted in the first position, an 8-bit binary command word or single byte instruction is signaled, whereas if a binary "0" is transmitted in the first position, a 24-bit or 3-byte instruction is signaled. The exact manner in which the single and multiple byte instructions are processed will now be discussed.

Assume, for example, that the first bit 1 of the instruction word is a binary "1," in which case the plotter is signaled to increment according to the single byte word format shown in FIG. 2*a*. the No. 2 bit indicates the sign, i.e., the direction of motion in the X dimension, whereas the No. 6 bit indicates the direction of motion in the Y direction. Bits 3, 4 and 7, 8 indicate the magnitude of the incremental step in the X and Y directions. According to the table shown in FIG. 2*c*, since the code corresponding to minus zero (100) in each direction is redundant, it is reserved to actuate certain special functions, a few examples of which are tabulated in FIG. 2*d*. As an illustration of the utilization of these special codes, consider the access and release of the auxiliary memory 105 (shown in FIG. 1), which will now be described.

Graphical plots frequently require numerous repetitions of the same symbol, line or configuration. In present day plotting operations, each such repetition must be separately transmitted, decoded, and the required plotting function executed. Referring again to FIG. 1, the present invention obviates the loss of time and repetitive calculations inherent in such systems by utilizing an auxiliary memory 105 which can be used to store a number of subroutines which are common to a particular type of plotting operation. A particular subroutine may be actuated by transmitting its address in the auxiliary memory. In FIG. 2*d* the control code 1000–100 is reserved for the purpose of accessing the auxiliary memory 105. When this single byte instruction, called the segment access, is received in the input register 103, the contents of the address in the auxiliary memory 105 specified by the next byte is transferred to the input register 103 to begin the desired subroutine. At the end of each routine, a segment release instruction 1001–100 is transmitted to the input register 103 via the path 106, thus causing the input register to receive its next instruction from the external data source via the path 107. The number of external subroutines which may be located by the 8-bit address is $2^8$ or 256. Where some subroutines have common elements, it is not necessary to store a separate routine for each configuration. By way of example, the auxiliary memory may be employed for storage of graphic alphabetic characters and symbols. Thus, the character "Q" is composed of a routine for writing an oval plus a routine for writing a slash. By loading the auxiliary memory so that the routine for writting an oval follows (without a segment release command) the routine for writing a slash, then a "Q" can be written by transmitting the address where the slash routine commences, whereas a zero or capital "O" may be written by transmitting the address where the oval routine commences. Since many of the alphabet letters and some of the numerals are composed of identical elements, a saving in storage may be achieved by judicious location of subroutines within the auxiliary memory 105.

Other examples where one of the fifteen possible redundant combinations may be used to command additional auxiliary tasks other than that of accessing and releasing the auxiliary memory include engaging the plotting element, disengaging the plotting element, resetting registers, and increments registers. Exemplary control codes of each of the above are tabulated in FIG. 2*d*.

The capability of being able to command a large number of incremental movements in a single instruction has a decided advantage over present plotting systems which normally respond, one increment at a time, to each transmitted command. For example, 100 transmissions are required to produce a one inch line in the X direction using 0.01 inch increments. By arranging the system logic to accommodate multiple byte instructions, the number of incremental steps per instruction can be indefinitely extended. For the 3-byte multiple instruction format shown in FIG. 2*b*, the number of increments in either the X or Y direction is $2^{10}$ or 1024. It is thus possible to plot line segments of considerable length using a single instruction. It may be observed that neither the bits 3–12 nor 15–24 denote expressly movement in either the X or Y direction. What is transmitted is the major "NT" and minor "NR" axis movement, bit number 13 being reserved to provide information as to which axis the larger number of increments is associated.

Figure 3:
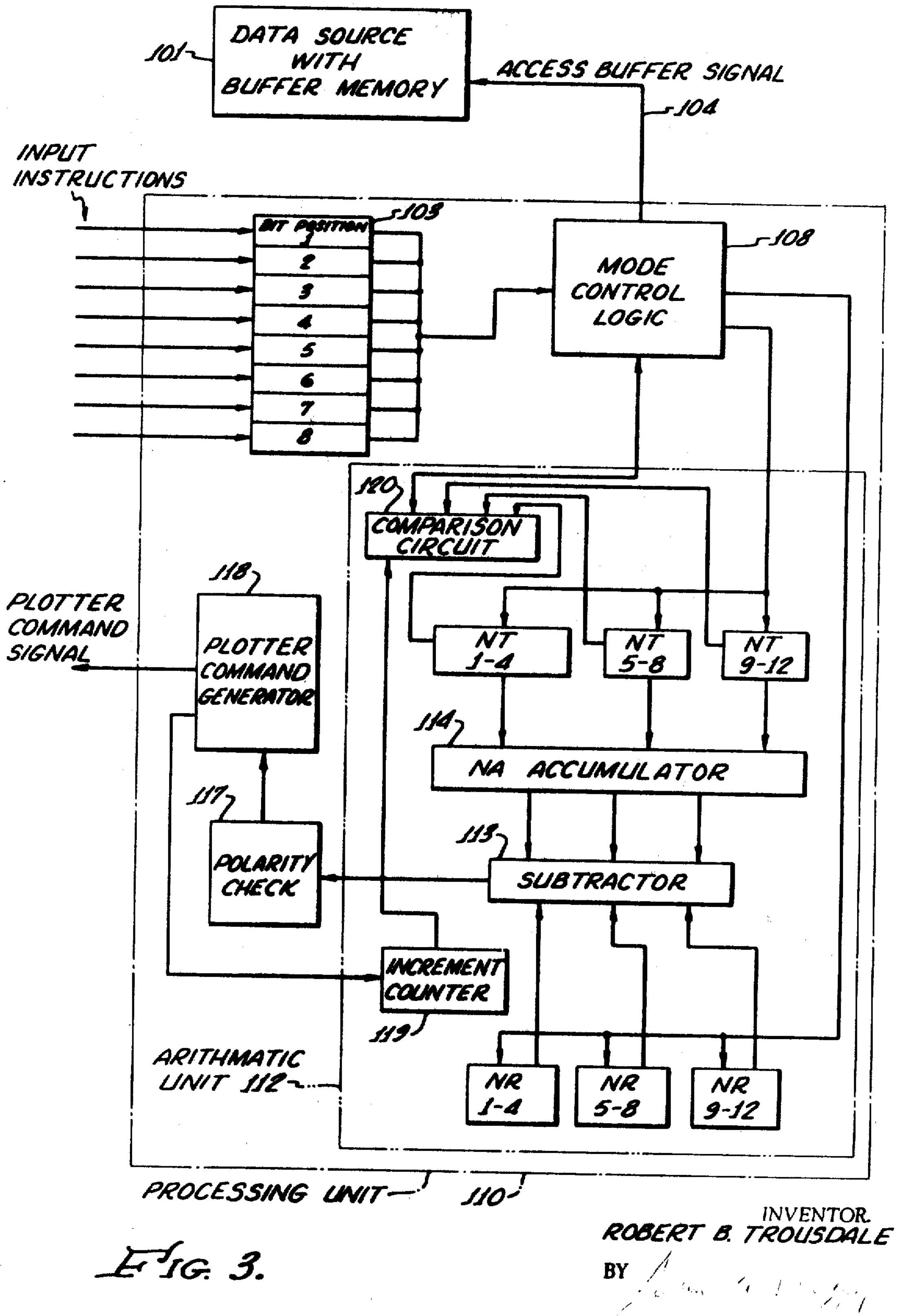
FIG. 3 shows a block diagram of the hardware which functions to perform an approximation of a straight line.
Figures 4A, 4B:
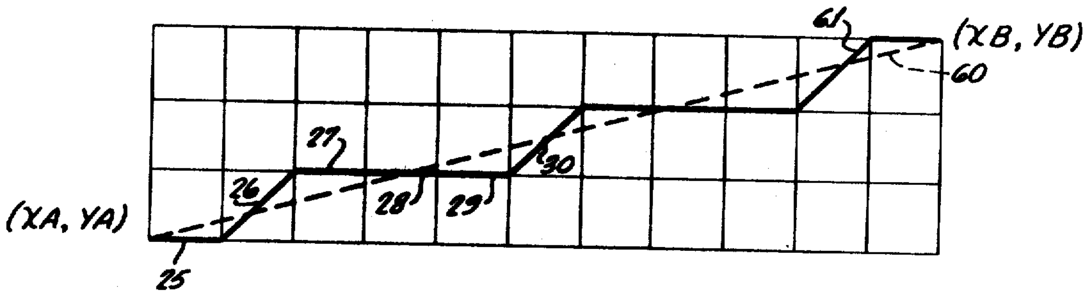
FIG. 4*a* illustrates the plotting steps generated by the hardware in FIG. 3 in a typical approximation.
FIG. 4*b* shows the 3-byte instruction word format corresponding to the plotting of steps shown in FIG. 4*a*.

In order to fully understood the procedural steps involved in executing the multiple byte instructions and the operation of the arithmetic circuits 112 which perform the algorithm required to approximate a straight line in an arbitrary direction by incremental plotting, consider the block diagram of the processing unit 110 shown in FIG. 3. Assume, for example, that the number of X increments is 11 and the number of Y increments is 3 so that the idealized movement is as shown by the dotted line 60 in FIG. 4*a*. The first bit of the instruction word (FIG. 4*b*) is a binary "0" thus indicating a 3-byte instruction word. The zero in the first bit position is sensed by the mode control logic circuit 108 which acts to transfer the high order bits of the "NT" number held in the input register 103 to the NT flip-flops 1–4 and 5–8 along with the sign of NT. When this transfer is completed, the data source is signaled to transmit the second byte which contains the low order NT bits, the sign of NR, the major axis of movement, and the two higher order NR bits. Another transfer is initiated so that the information in the input register is stored in the NT flip-flops 9–12 and the NR flip-flops 1–4. Upon completion of this transfer, the data source is again signalled and the remaining low order bits of NR are loaded into the input register and transferred by the mode logic control 108 to the NR flip-flops 5–8 and 9–12. The two number NT and NR are now used to actuate the plotter to approximate the dotted line 60 shown in FIG. 4 in the following manner. As an initializing step, ½ of the value of the larger number (NT) is loaded into the NA accumulator 114. This is easily accomplished by loading NT into NA and making one right shift which has the effect of dividing a base "2" number in half. The value of the number stored in NR is next subtracted from the contents of NA in the subtractor 113 and the sign of the result sensed by the polarity checker 117. If the result is positive, the plotter is actuated by the command generator 118 to make a single step in the direction of the major axis (as determined by bit No. 13). For the sample numbers 11 and 3 as illustrated in FIG. 4, this first step corresponds to the increment labeled 25. The subtraction process is again repeated, the resultant sign checked, and if it is positive, another increment is taken along the major axis. Should the result of the subtraction be negative, The plotter is signalled to make a combination step. This would be the situation for the example being considered, i.e., $$1\tfrac{1}{2}-3-3=-\tfrac{1}{2}$$

and corresponds to the step labeled 26 in FIG. 4. After the combination step is made, NT is added to the negative value in NA, thus restoring its contents to a positive value once more. Then, the subtraction of NR from NA is made again, the difference as before, checked for polarity, and another major axis step taken. This is repeated until a negative difference results, at which time another combination step 30 is made. The latter process is then repeated until the total number of incremental steps taken as recorded by the increment counter 119 is equal to the value of NT at which time the comparison circuit 120 signals a completion of the process and the data source 102 is requested by the mode control logic 108 to transmit the next instruction. The resultant approximation is shown by the solid line 61 in FIG. 4.

It will be apparent that 3-byte instructions may also be received from the auxiliary memory 105 shown in FIG. 1. Thus it is possible for groups of straight lines to be plotted by accessing the auxiliary memory 105 rather than to transmit each line separately from the data source 101.

The basic single and multiple byte system may be used in combination with existing plotting devices and data transports to facilitate the rapid plotting of graphical information. The applicatiton of an auxiliary memory for storing repetitive subroutines greatly diminishes the time required by the external data source to generate and transmit individual commands. Because the information is transmitted by instructions using a binary positional notation number format, an extremely large number of incremental movements may be transmitted with a single instruction.

The straight line algorithm described above illustrates a typical routine. It will be observed that the inventive concept of employing a special purpose processor in this regard is not limited in its application to the exemplary straght line approximation considered herein.

The teachings of the invention are applicable to cathode ray displays and other high speed plotting devices as well as slower speed electro-mechanical plotters. Although an 8-bit format utilizing a single and triple byte instruction word has been illustrated, it is obvious that numerous other instruction formats are possible. It will also be understood that the physical embodiment of the invention discussed hereinabove is by way of illustration only and that numerous modifications and other applications of the basic apparatus are possible without departing from the spirit of the invention.

I claim:

1. A system for plotting graphical information comprising: a data source for supplying incremental plotting instructions in digital weighted postional format comprising a single byte instruction word having a first group of binary bits positionally weighted to indicate the step length in a first drection and a second group of binary bits positionally weighted to indicate the step length in a second direction, a multiple byte instruction word having a first group of binary bits positionally weighted to indicate the number of steps in one direction and a second group of binary bits positionally weighted to indicate the number of steps in another direction, and at least one binary bit position of the first byte of each instruction word for indicating the number of bytes per instruction; a processing unit for generating plotter command signals from instructions received from said data source; an incremental plotting device responsively coupled to said processing unit for executing command signals generated by said processing unit from instructions received by said data source, and including a mode control logic means responsive to said format for identifying single and multiple byte instruction words.

2. A system for plotting graphical information comprising a processing unit for generating plotter command signals from instructions received from said data source including: an input register for receiving and storing each successive byte of a single or multiple byte instruction word; logic means responsively coupled to said input register for determining the number of bytes comprising each instruction word; a major axis register responsively coupled to said input register for storing the successive bytes of a multiple instruction word which encode the number of major axis increments; a minor axis register responsively coupled to said input register for storing the successive bytes of a multiple instruction word which encode the number of minor axis increments; an accumulator responsively coupled to said major axis register for storing the contents of said major axis register; means for shifting the contents of said accumulator whereby the encoded number of major axis increments may be halved; logic means for iteratively subtracting the contents of said minor axis register from the contents of said accumulator; means for generating a plurality of major axis step commands corresponding in number with the number of times the contents of said minor axis register can be subtracted from the contents of said accumulator; means for generating a combination major-minor axis step command when the contents of said accumulator changes polarity as a consequence of the iterative subtraction of said minor axis register contents; means for adding the contents of said major axis register to said accumulator after each combination step whereby the iterative subtractions of the contents of said minor axis register may be repeated; logic means for terminating the iterative operations when the total number of major and combination axis step commands which have been generated is equal to the contents of said major axis register whereby the plotting operation may be concluded with a resultant approximation to a straight line whose magnitude and direction are determined by the number of major and minor axis increments encoded in the instruction word; an incremental plotting device responsively coupled to said processing unit for executing command signals generated by said processing unit from instructions received by said data source; a data source for supplying incremental plotting instructions in a format comprising both a single byte instruction word having a first group of binary bits positionally weighted to indicate the step length in a first direction and a second group of binary bits positionally weighted to indicate the step length in a second direction and a multiple byte instruction word having a first group of binary bits positionally weighted to indicate the number of steps in one direction and a second group of binary bits positionally weighted to indicate the number of steps in another direction wherein at least one binary bit position of the first byte of each instruction word indicates the number of bytes per instruction.

3. A graphical plotting system comprising: an incremental plotting device; a data source for supplying plotting instructions in digital weighted positional format comprising a single byte instruction word having a first group of binary digits positionally weighted to indicate the step length in a first direction and a second group of binary digits positionally weighted to indicate a step length in another direction; a double byte instruction word having said first byte encoded to signal an auxiliary memory access and said second byte encoded to indicate the address in said auxiliary memory where the desired subroutine commences; and including a mode control logic means responsive to said format for identifying single and multiple byte instruction words and an auxiliary memory adapted to be accessible by instruction words supplied from said data source; a processing unit responsively coupled to said data source and said auxiliary memory for generating plotter command signals from instructions received from said data source or said auxiliary memory whereby said incremental plotting device may be actuated by instructions received directly from said data source or by a subroutine stored in said auxiliary memory.

4. A graphical plotting system comprising: an incremental plotting device; a data source for supplying plotting instructions in digital weighted positional format comprising a single byte instruction word having a first group of binary digits positionally weighted to indicate the step length in a first direction and a second group of binary digits positionally weighted to indicate a step length in another direction; a double byte instruction word having said first byte encoded to signal an auxiliary memory access and said second byte encoded to indicate the address in said auxiliary memory where the desired subroutine commences; a triple byte instruction word having a first group of binary bits positionally weighted to indicate the number of steps in one direction, and a second group of binary bits positionally weighted to indicate the number of steps in another direction; at least one binary bit position of the first byte of each instruction word for indicating the number of bytes per instruction, and including a mode control logic means responsive to said format for identifying single and multiple byte instruction words and an auxiliary memory adapted to be accessible by instruction words supplied from said data source; a processing unit responsively coupled to said data source and said auxiliary memory for generating plotter command signals from instructions received from said data source or said auxiliary memory whereby said incremental plotting device may be actuated by instructions received directly from said data source or by a subroutine stored in said auxiliary memory.

5. The system described in claim 4 wherein said processing unit comprises: a plotter command generator for decoding single byte instructions to command incremental plotting movements directly; an arithmetic unit for decoding triple byte instructions to generate the plotting commands required to approximate a straight line; an input register adapted to store successive bytes of an instruction word; mode control means responsively coupled to said input register for actuating said command generator, or said auxiliary memory or said arithmetic unit according to whether a single, double, or triple byte instruction is received in said input register.

6. A graphical plotting system comprising: an incremental plotting device; a data source for supplying plotting instructions in digital weighted positional format comprising a single byte instruction word having a first group of binary digits positionally weighted to indicate the step length in a first direction and a second group of binary digits positionally weighted to indicate a step length in another direction; a double byte instruction word having said first byte encoded to signal an auxiliary memory access and said second byte encoded to indicate the address in said auxiliary memory where the desired subroutine commences; a triple byte instruction word having a first group of binary bits positionally weighted to indicate the number of steps in one direction, and a second group of binary bits positionally weighted to indicate the number of steps in another direction; at least one binary bit position of the first byte of each instruction word for indicating the number of bytes per instruction; and including an auxiliary memory adapted to be accessible by instruction words supplied from said data source; a processing unit responsively coupled to said data source and said auxiliary memory for generating plotter command signals from instructions received from said data source or said auxiliary memory, said processing unit comprising a plotter command generator for decoding single byte instructions to command incremental plotting movements directly; an arithmetic unit for decoding triple byte instructions to generate the plotting commands required to approximate a straight line, said arithmetic unit comprising: a major axis register responsively coupled to said input register for storing the successive bytes of a triple instruction word which encode the number of major axis increments; a minor axis register responsively coupled to said input register for storing the successive bytes of a triple instruction word which encode the number of minor axis increments; an accumulator responsively coupled to said major axis register for storing the contents of said major axis register; means for shifting the contents of said accumulator whereby the encoded number of major axis increments may be halved; logic means for iteratively subtracting the contents of said minor axis register from the contents of said accumulator; means for generating a plurality of step commands corresponding in number with the number of times the contents of said minor axis register can be subtracted from the contents of said accumulator; means for generating a combination major-minor axis step command when the contents of said accumulator changes polarity as a consequence of the iterative subtraction of said minor axis register contents; means for adding the contents of said major axis register to said accumulator after each combination step whereby the iterative subtractions of the contents of said minor axis register may be repeated; logic means for terminating the iterative operations when the major and combination axis steps generated equals the contents of said major axis register whereby the plotting operation may be concluded with a resultant approximation to a straight line whose magnitude and direction are determined by the number of major and minor axis increments encoded in the instruction word; and including an input register adapted to store successive bytes of an instruction word; mode control means responsively coupled to said input register for actuating said command generator, or said auxiliary memory or said arithmetic unit according to whether a single, double or triple byte instruction is received in said input register whereby said incremental plotting device may be actuated by instructions received directly from said data source or by a subroutine stored in said auxiliary memory.

References Cited

UNITED STATES PATENTS

| | | | |
|---|---|---|---|
| 3,391,394 | 7/1968 | Ottaway | 340—172.5 |
| 3,425,038 | 1/1969 | Trousdale | 340—172.5 |
| 3,434,113 | 3/1969 | Wiley et al. | 340—172.5 |
| 3,444,527 | 5/1969 | Hartley et al. | 340—172.5 |
| 3,447,134 | 5/1969 | Thompson et al. | 340—172.5 |

PAUL J. HENON, Primary Examiner

R. F. CHAPURAN, Assistant Examiner

U.S. Cl. X.R.

235—151.11